United States Patent
Jordan et al.

(10) Patent No.: US 10,297,026 B1
(45) Date of Patent: May 21, 2019

(54) TRACKING OF A DYNAMIC CONTAINER IN A VIDEO

(71) Applicant: Amazon Technologies, Inc., Seattle, WA (US)

(72) Inventors: Isaac M. Jordan, Glasgow (GB); Christopher de Beer, Edinburgh (GB); Shane Girish, Endinburgh (GB)

(73) Assignee: Amazon Technologies, Inc., Seattle, WA (US)

( * ) Notice: Subject to any disclaimer, the term of this patent is extended or adjusted under 35 U.S.C. 154(b) by 232 days.

(21) Appl. No.: 15/363,875

(22) Filed: Nov. 29, 2016

(51) Int. Cl.
*G06K 9/00* (2006.01)
*G06T 7/00* (2017.01)
*G06T 7/60* (2017.01)
*G06T 7/40* (2017.01)
*G06K 9/62* (2006.01)

(52) U.S. Cl.
CPC ............ *G06T 7/004* (2013.01); *G06K 9/6202* (2013.01); *G06T 7/408* (2013.01); *G06T 7/60* (2013.01); *G06T 2207/10016* (2013.01)

(58) Field of Classification Search
CPC ........... G06T 7/004; G06T 7/408; G06T 7/60; G06T 2207/10016; G06K 9/6202
See application file for complete search history.

(56) References Cited

U.S. PATENT DOCUMENTS

| | | | |
|---|---|---|---|
| 9,886,774 B2* | 2/2018 | Fathi | G06T 7/579 |
| 2009/0257621 A1* | 10/2009 | Silver | G06K 9/6202 |
| | | | 382/103 |
| 2015/0023602 A1* | 1/2015 | Wnuk | G06F 17/30247 |
| | | | 382/190 |

* cited by examiner

*Primary Examiner* — Yon J Couso
(74) *Attorney, Agent, or Firm* — Eversheds Sutherland (US) LLP

(57) ABSTRACT

Tracking of a defined area over a series of video frames that compose a video is provided. Various rules regulate the identification of a reference area to be tracked and the determination of subsequent areas that correspond to the reference areas over a series of respective images included the series of video frames. Metadata indicative of placement of a subsequent area in a subsequent image can be updated and retained. A mask video that can permit avoiding or otherwise mitigating occlusion of foreground elements of the subsequent image also can be updated and retained. Such metadata and mask video can permit injecting customized content into the video for which the reference area is tracked.

18 Claims, 8 Drawing Sheets

TRACKING OF A DYNAMIC CONTAINER IN A VIDEO

BACKGROUND

Personalization of digital content has become nearly ubiquitous in various implementations ranging from advertising and sports broadcasts to gaming. Yet, injection of digital content into a digital video can entail a laborious process that typically is left to be performed by highly experienced practitioners. As such, much remains to be improved in the tracking of digital objects in various types of digital videos.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1:
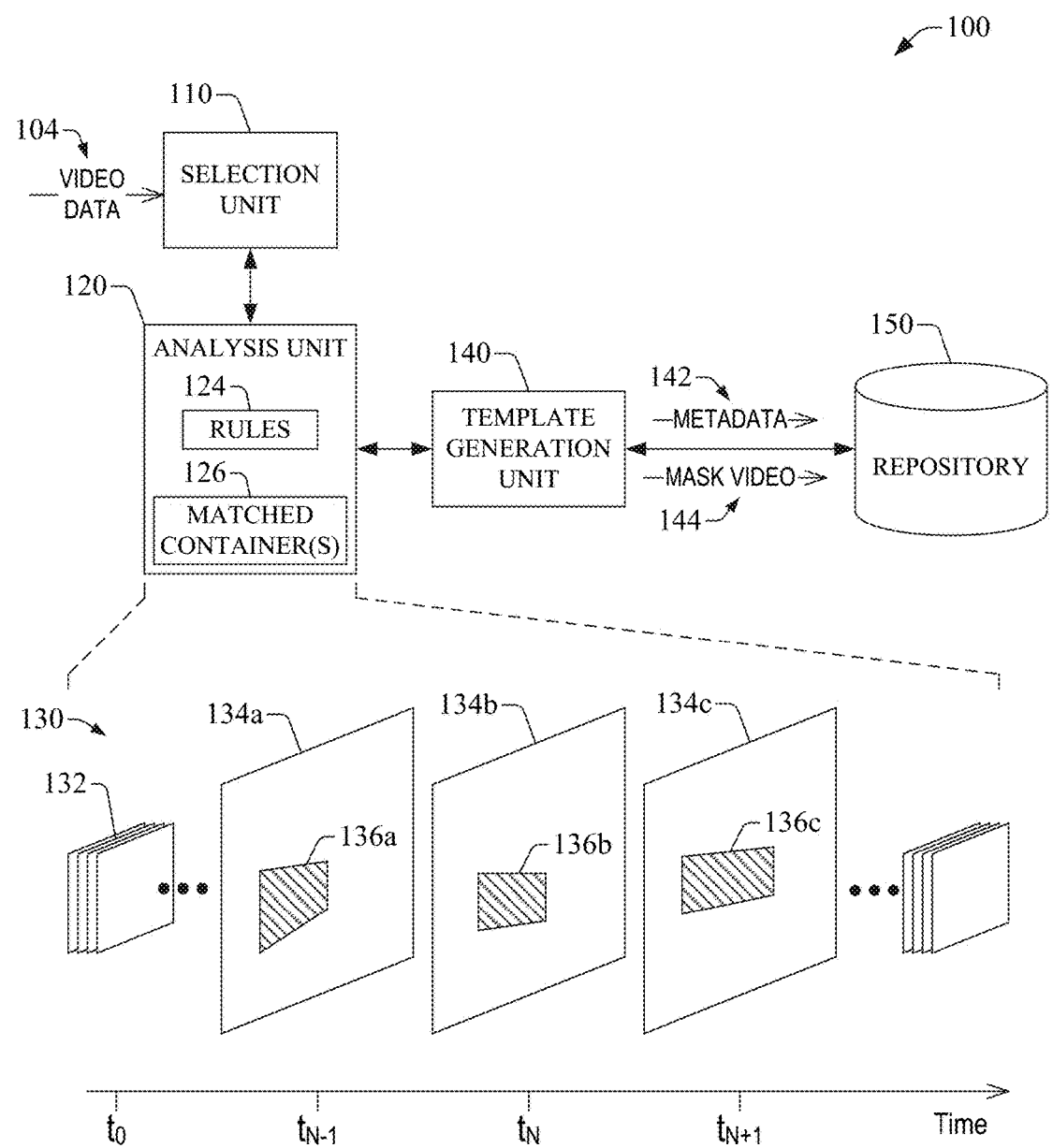
FIG. 1 presents an example of an operational environment for the tracking of a defined area in a digital video in accordance with one or more embodiments of the disclosure.

The disclosure recognizes and addresses, in at least certain embodiments, the issue of tracking of a defined area within a video. The video can be embodied in or can include video data indicative or otherwise representative, in some implementations, of digital audio and/or digital images embodying, for example, a motion picture, an animation, a gameplay or another segment of a video game; and the like. The disclosure provides embodiments of systems, devices, and techniques for the tracking of a defined area over a series of video frames that compose a video. The defined area can be embodied in a closed area having a boundary that defines a shape of the closed area, such as polygon or another geometrical shape. As such, while the disclosure is not limited to polygons, embodiments of the disclosure are described with reference to a polygon for the sake of illustration. The tracking of the defined area can permit the replacement of content within or otherwise associated with the area on a frame-by-frame basis or at defined frames within the video. In some embodiments, the tracking of the defined area include the application of one or more rules to determine such an area within a reference image included in a reference video frame. At least one of the rule(s) can permit evaluation of selection information indicative or otherwise representative of one or more reference locations in the reference image. One or more other rules can be applied to identify features within or otherwise associated with the defined area. Such other rule(s) also can be applied to a subsequent image included in a subsequent video frame constituting the video in order to determine second features of the subsequent image. Further, one or more rules can be applied to the second features in order to determine a confidence score indicative of accuracy of a correspondence between one of the second features and one of the reference features. The confidence score (or, in some embodiments, confidence metric) can be utilized or otherwise leveraged to accept a subset of the second features as corresponding to the features, and thus, representing the defined area in the subsequent image. The subset of the features can define a current area in the subsequent image that corresponds to the reference area. As such, in some aspects, the current area can be analyzed to determine placement of the current area within the subsequent image. In one aspect, the analysis can yield location information indicative of positions that can define or otherwise represent the current area, and also can yield perspective information indicative of an arrangement of the current area relative to other elements within the subsequent image. The location information and/or the perspective information can permit updating metadata indicative of placement of a series of areas corresponding to the reference area. In addition, such information, individually or in combination, can permit updating a mask video that can be used to avoid or otherwise mitigate artifacts, such as occlusion of foreground elements of the subsequent image. Such metadata and mask video, individually or collectively, can permit or otherwise facilitate injecting customized content into the video for which the reference area is tracked. The mask video also can be used to avoid artifacts during presentation of a personalized video including customized content that replaces other content within the tracked area.

In at least some embodiments of this disclosure, the application of first rules to detect features or other types of elements within an image contained in a video frame, and the application of second rules to accept and reject other features or other elements within another image contained in a subsequent video frame can permit the tracking of an area in a reliable fashion. In addition the application of such rules greatly improve technological processes, such as editing of digital content, by allowing the automation of manipulation of various types of digital content. In such embodiments, the rules and/or techniques according to aspects of the present disclosure provide improved techniques for the manipulation of digital content, rather than simply implementing old editing practices in a new environment. As such, rather than accelerating conventional editing processes for the manipulation of digital content by simply relying on a computational environment, embodiments of the present disclosure speed-up editing processes and/or render those processes more reliable as a result of the application of disclosed tracking techniques.

While embodiments of the disclosure can provide improvements to the operation of a computing system, at least some of the embodiments provide an improvement to computer-related technology by permitting or otherwise facilitating the performance of tracking of a digital container not previously performable by a computing system. To that point, in some aspects, embodiments of the disclosure can provide, at a minimum, a particular way to achieve the tracking of the digital container. For instance, rather than providing results related to collecting and analyzing information, at least some embodiments of this disclosure can apply rules to determine or otherwise identify a defined closed area associated with the digital container and to further identify, over a series of frames of a video segment, other closed areas that correspond to the defined closed area.

Referring to the drawings, FIG. 1 illustrates an example of an operational environment 100 for the tracking of a defined area in a digital video in accordance with one or more embodiments of the disclosure. The operational environment 100 can include a selection unit 110 that can receive video data 104 that embodies or constitutes, in some implementations, digital images embodying, for example, a motion picture, an animation, a gameplay or another segment of a video game, and the like. The digital images can embody or can constitute, in some implementations, multiple motion pictures, animations, gameplays or segments of several video games, a combination thereof, or the like. As such, in one embodiment, the video data 104 can embody or can include multiple frames including respective multiple digital images. The digital selection unit 110 can select a frame of the multiple frames and can present an image included in the frame. To that end, in one embodiment, the selection unit 110 can include a display device that can present the image. The selection unit 110 also can receive selection information indicative of one or more locations within the image. In one implementation, the selection unit 110 can receive the selection information from a peripheral device coupled to the display device that can present the image. In addition or another implementation, the display device can permit interaction with the presented image. To that end, the display device can include or can be functionally coupled to a device that can detect a physical interaction with a surface, such as a transparent screen, of the display device at a specific location. The physical interaction can be embodied in or can include, for example, a gesture, or a tap, a swipe, or other forms of touch or application of pressure, and can identify a defined location within the image.

The selection unit 110 can send at least a portion of the video data 104 and/or at least a portion of the selection information received at the selection unit 110 to an analysis unit 120. In some aspects, the analysis unit 120 can utilize or otherwise leverage the selection information to determine or otherwise identify one or more locations within the image included in the frame identified by the selection unit 110. In a scenario in which the selection information is indicative or otherwise representative of multiple locations, the analysis unit 120 can assign the multiple locations to respective multiple vertices of a polygon. In addition, the analysis unit 120 can track the polygon in accordance with aspects described herein. In some embodiments, the analysis unit 120 can determine multiple polygons associated with the multiple locations. In one example, the analysis unit 120 can determine a polygon for each of the multiple locations. In another example, the analysis unit 120 can determine a first polygon for a first subset of the multiple locations and a second polygon for a second subset of the multiple locations. In yet another scenario in which the selection information is indicative or otherwise representative of a single location, the analysis unit 120 can determine or otherwise define a bounding box associated with a confined closed area (such as a polygon or another area of different geometric shape) within the image included in such a frame. The analysis unit 120 also can track the confined closed surface in accordance with aspects described herein. In some embodiments, regardless the specific manner in which the analysis unit 120*a* determines or otherwise identifies a specific polygon and/or a specific confined closed area, the analysis unit 120 can send image information representative or otherwise indicative such a polygon or confined closed area to the selection unit 110. In response to receiving the image information—e.g., upon receiving, after receiving, or caused by signaling indicative of receiving the image information—the selection unit 110 or, in some instances, a display device integrated into or otherwise associated with the selection unit 110 can display a prompt or another type of indicia to confirm that the polygon or the closed surface is or includes the desired digital container to be tracked in accordance with aspects described herein. In addition or in other scenarios, the selection unit 110 can permit editing or otherwise modifying aspects of the polygon or closed surface in order to refine the digital container to be tracked. The selection unit 110 can send other image information indicative or otherwise representative of the edited or otherwise modified polygon or closed area to the analysis unit 120 for tracking of such polygon or closed area.

Figure 2:
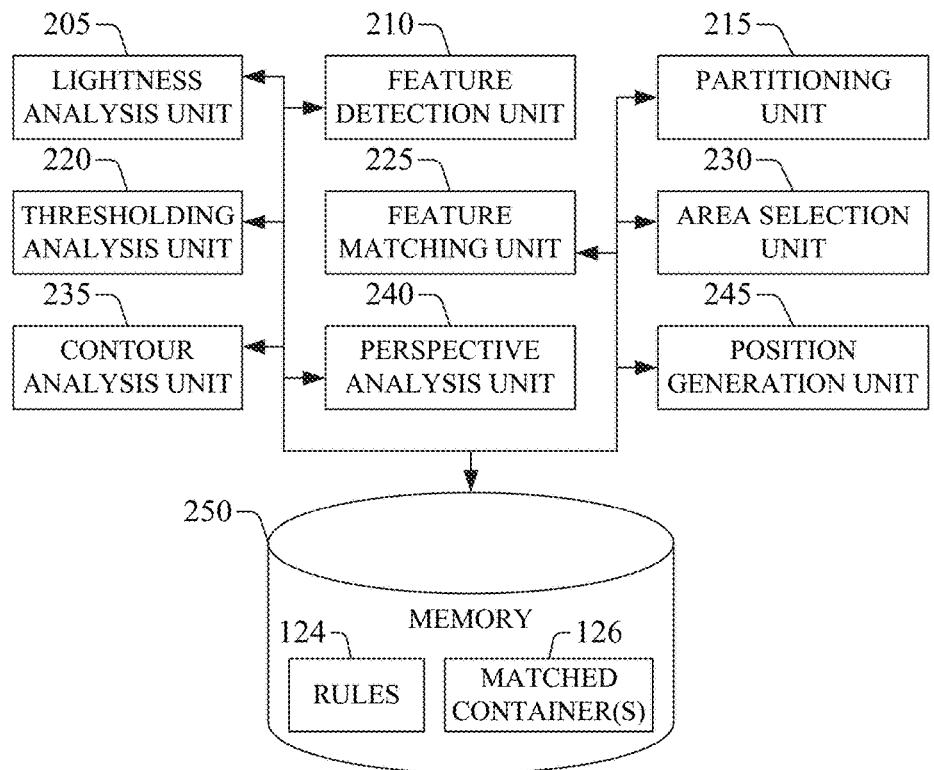
FIG. 2 presents an example of analysis unit for the tracking of a defined area in a digital video in accordance with one or more embodiments of the disclosure.
Figure 4A:
FIG. 4A presents an example of polygons within an image in accordance with one or more embodiments of the disclosure.
Figure 4B:
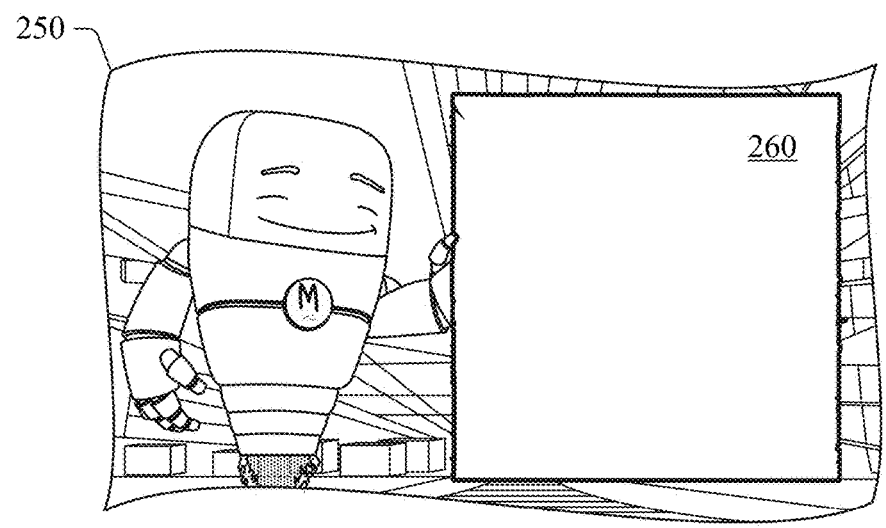
FIG. 4B presents an example of a polygon within another image in accordance with one or more embodiments of the disclosure.
Figure 4C:
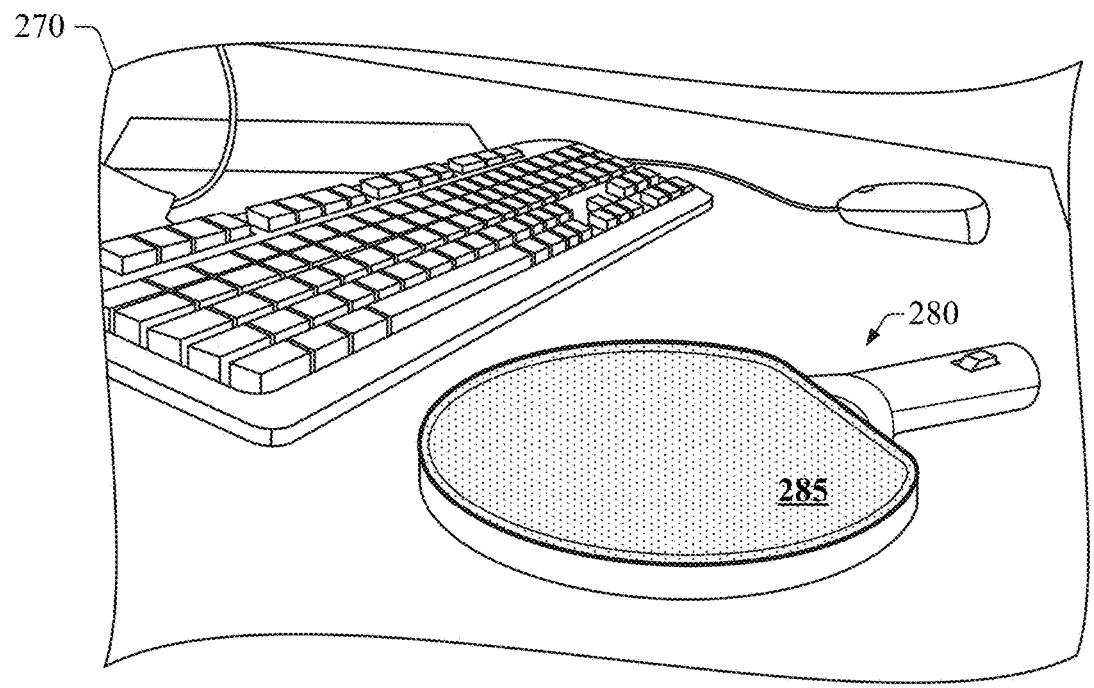
FIG. 4C presents an example of another polygon within yet another image in accordance with one or more embodiments of the disclosure.

In some embodiments, such as the embodiment shown in FIG. 2, the analysis unit 120 can include various units that permit determining a polygon or any other confined closed area within an image. As illustrated in in FIG. 2, the analysis unit 120 can include a lightness analysis unit 205 that can be analyze or otherwise evaluate lightness of one or more pixels in the an image in order to determine one or more values of lightness at or in proximity to a location in an image, the location identified by the selection unit 110. As further illustrated in FIG. 2, the analysis unit 120 also can include thresholding analysis unit 220 that can utilized or otherwise rely on a defined value of lightness, such as a median lightness value of the image, to define a threshold and transition the image to a black-and-white image. The analysis unit 120 can process the black-and-white image in order to determine a boundary of the closed area proximate to a location identified by the selection unit 110. To that end, as illustrated in FIG. 2, the analysis unit can include a contour analysis unit 235 that can perform contour analysis on the black-and-white image and, based at least on the contour analysis, the analysis unit 120 can determine the boundary of the closed area. To that end, as illustrated in FIG. 2, the analysis unit 120 can include an area selection unit 230 that can define the closed area. In addition, in some embodiments, the area selection unit 230 also can determine attributes, such as color, size, and/or position, of the closed area, that can be utilized for as supplemental information or metadata that characterized the closed area and that may be relied on for tracking in accordance with aspects described herein. In some instances, the boundary can be formed by edges determined by the contour analysis unit 235. In other instances, the boundary can be formed by a curved line. In some embodiments, the analysis unit 120 can rely on other types of analyses in order to determine a polygon or another type of confined closed area. The analyses can include for example, determination of Euclidean distances in hue-saturation space for a region proximate to a location identified by the selection information provided by the selection unit 110. In another example, the analyses can include floodfill techniques. As an illustration of determination of closed confined areas, FIG. 4A presents an example of polygons, represented with thick black lines, within an image. As mentioned, in one implementation, the analysis unit 120 can determine the polygons based at least on multiple locations received in selection information. In another implementation, the analysis unit 120 can determine at least one of the polygons based at least on assigned at least a subset of the multiple locations to respective vertices of the polygon to be determined. Further, FIG. 4B presents an example of a polygon 460 within an image 450. The analysis unit 120 can determine the polygon 460 based at least on selection information indicative of a location within image 460 that is included in the polygon 460. FIG. 4C illustrates another example of a polygon 485 within an image 470, where the analysis unit 120 can determine the polygon 485 based at least on selection information indicative of a location within an object 480 (a ping-pong paddle, in this example).

With further reference to FIG. 1, in aspects of tracking, the analysis unit 120 can apply at least one first rule to an image included in a defined frame in the multiple frames represented by the video data 104. In scenario in which a series 130 of M frames (with M being a natural number) can be represented by the video data 104 and can be processed by the analysis unit 104, for a frame 134a in the series 130 the analysis unit 120 can apply the at least one first rule to an image included in such a frame in order to identify first features (e.g., localized features of interest, edges, contours, or the like) in a first area spanned by a polygon 136a. To that end, in some aspects, the rule can embody or represent a technique to determine a feature and/or descriptor within a digital image. Thus, to apply the rule, for example, the analysis unit 120 can implement (e.g., execute) one of numerous techniques the permit determining features and/or descriptors within the digital image. Such techniques can include, for example, exhaustive inspection or otherwise determination of features in the image; features from accelerated segment test (FAST) technique; binary robust independent elementary features (BRIEF) technique; oriented FAST and rotated BRIEF (ORB) technique; smallest univalue segment assimilating nucleus (SUSAN) technique; speeded up robust features (SURF) technique; scale-invariant feature transform (SIFT) technique, or the like. The at least one first rule can be included in a group of rules 124 retained in the analysis unit 120 and, in some embodiments, the first features can be embodied in or can include scale-invariant keypoints within the image. In some embodiments, as illustrated in FIG. 2, the analysis unit 120 can include a feature detection unit 210 that can apply the at least one first rule to determine the first features. In one aspect, application of the at least one first rule can include the partitioning of the image into defined regions in which coarse features can be determined prior to determining finer, more precise features that constitute the first features. The feature detection unit 210 can be utilized to divide the image into the defined regions.

In addition or in other embodiments, the feature detection unit 210 can determine a histogram (which, in one aspect, can be considered a feature) of pixel information of pixels contained in the first area spanned by a polygon 136a. In some aspects, the histogram can be multidimensional and the pixel information can include, for example, hue information, saturation information, RGB color information, a combination thereof, or the like. Further or in other embodiments, the feature detection unit 210 also can determine image moments, such as Hu moments, of the image information indicative or otherwise representative of such a first area of a portion thereof (e.g., an object contained in the first area). Similar to the foregoing histograms, an image moment can be considered to represent a feature of the first area or the portion thereof.

As illustrated, the frame 134a corresponds to an instant $t_{N-1}$ (with N+1≤M and N being a natural number) in the series of M frames. In addition, the polygon 136a can correspond to an initial polygon (not depicted) determined based at least on selection information associated with an initial image included in an initial frame 132, corresponding to an initial instant $t_0$, in the series of M frames. In some embodiments, as time progresses, the analysis unit 120 can access frame 134b corresponding to another instant $t_N$ in the series of M frames. The analysis unit 120 can apply the at least one first rule to another image within the frame 134b to identify second features. As such, as mentioned herein, the analysis unit 120 can implement (e.g., execute) one of numerous techniques the permit determining a feature and/or a descriptor within a digital image, such techniques can include exhaustive inspection or otherwise determination of features in the image; FAST technique; BRIEF technique; ORB technique; SUSAN technique; SURF technique; SIFT technique, or the like. Similar to the first features, in one embodiment, the second features can be embodied in or can include scale-invariant keypoints contained in the image within the frame 134b. The scale invariance refers to, in some aspects, the feature being invariant to uniform scaling and orientation of an object in an image or the image itself. In addition, the analysis unit 120 can apply at least one second rule to the second features in order to determine a subset of the second features that correspond to the first features. To that end, in some embodiments, as illustrated in FIG. 2, the analysis unit 120 can include a feature matching unit 225 that can apply the at least one second rule to determine the subset of the second features. In some instances, a portion of the subset of the second features may have a satisfactory correspondence with the first features and, therefore, the analysis unit 120 can apply at least one third rule to the subset of second features in order to remove or otherwise reject one or more features from the first subset, resulting in a second subset of the second features. The at least one second rule and the at least one third rule can be included in the group of rules 124.

The features included in the second subset of the second features can be associated with the first area spanned by the polygon 136a. As such, the analysis unit 120 can determine a confidence score for each (or, in some embodiments, at least one) feature in the second subset. The confidence score (e.g., a real number, an integer number, or a natural number) can be indicative or otherwise representative of a degree of certainty (or a degree of accuracy) in the correspondence between a feature in the second subset of the second features and such a first area. As an illustration, the confidence score can be embodied in a scalar in the range from 0 to 1. The analysis unit 120 can determine the confidence score in numerous ways. In one example, the analysis unit 120 can utilize or otherwise leverage one or more rules to compute a confidence score. In some implementations, multiple rules can be utilized to determine a confidence score. Specifically, for a feature in the second subset of features, the analysis unit 120 can apply a first rule to determine a nearest neighbor of the feature in feature space. The nearest neighbor is included in features in the first area, and can be a specific feature having a minimum Euclidean distance from a descriptor vector of the feature in the second subset of features. In some embodiments, a nearest-neighbor feature can be determined or otherwise identified using a best bin first (BBF) search technique or another variation of a k-d tree algorithm, for example, in a space of features. In one example implementation, the descriptor vector can be 128-tuple having unit length. Unit length can provide invariance with respect to affine changes in illumination (e.g., contrast changes and/or brightness changes) in the reference area. Each of the 128 elements corresponds to a normalized value of an orientation histogram count determined for a (4-pixel)×(4-pixel) region within a (16-pixel)×(16-pixel) vicinity of the feature of the first area, where the (4-pixel)×(4-pixel) region is partitioned into eight bins in order to determine an orientation histogram. Such a count corresponds to a sum of gradient magnitudes along one of eight sample directions (or bins). Orientation magnitudes that are utilized to determine orientation counts can each be weighted by a Gaussian function having σ=(16 pixels)/2. Such a Gaussian weighting can mitigate or otherwise avoid large changes in the descriptor vector with small changes in the position of the region, and can lessen the emphasis of gradients distant from a center of the descriptor (e.g., the center of the (4-pixel)×(4-pixel) region). Other type of weighting also can be applied in order to mitigate or otherwise avoid boundary effects on the determination of the descriptor vector. While regions having specific number of pixels (e.g., four pixels or 16 pixels) are described herein, the disclosure is not limited in such respect and regions having different number of pixels also are contemplated.

In addition, the analysis unit 120 can apply a second rule to determine a second nearest-neighbor of the feature in feature space. The second nearest-neighbor also is included in features in the first area, and can be a second specific feature having a second closest Euclidean distance from the descriptor vector of the feature of the second features. The second nearest-neighbors also can be determined or otherwise identified via the BBF search technique utilized to determine nearest neighbors or another variation of a k-d tree algorithm, for example.

Further, in some aspects, the confidence score can be embodied in or can include a ratio between (i) a distance from a feature in the second subset of the second features to a nearest-neighbor of such a feature as described herein and (ii) a distance from the feature in the second subset of the second features feature to a second nearest-neighbor of the feature as described herein.

The analysis unit 120 can compare the confidence score(s) to a defined threshold score (e.g., a scalar in range from 0.8 to 1.0) in order to determine a second area corresponding to the first area. The analysis unit 120 can determine, using at least the second area, a polygon 136*b* within an image included in the frame 134*b*. The analysis unit 120 can retain information indicative or otherwise representative of the second area and/or the polygon 136*b* in one or more memory elements 126, which can be collectively referred to as matched container(s) 126. It is noted that information indicative or otherwise representative of the polygon 136*a* and an area associated therewith also can be retained in the matched container(s) 126. It is noted that the disclosure is not limited to relying on confidence scores and/or threshold scores in order to ascertain a correspondence between a pair of features in respective images. In some embodiments, a rule can define other types of confidence metrics representative of respective accuracy of a correspondence (or match) between features, and another rule can define a discriminator (numeric or logic, for example) that can be used to classify a feature in an image as a satisfactory feature—e.g., a feature exceeding satisfying confidence criterion for a correspondence to another feature in another image.

The analysis unit 120 can access another portion of the video data 104 to continue the tracking of the initial polygon in a frame 134*c* that corresponds to an instant $t_{N+1}$ in the series 130 of M frames. The analysis unit 120 can apply the at least one first rule to another image within the frame 134*c* to identify features present in the image. The analysis unit 120 also can apply at least one second rule to the features in order to determine a subset of the features that correspond to the first features in the initial image included in the initial frame 132 of the series of M frames. As mentioned, in some instances, a portion of the subset of the features may have a satisfactory correspondence with the first features and, therefore, the analysis unit 120 can apply at least one third rule to the subset of features in order to remove or otherwise reject one or more features from the subset, resulting in a second subset of the features.

The features included in the second subset of the features can be associated with the first area spanned by the reference polygon in the image included in the initial frame 132. Thus, similar to the analysis discussed herein, the analysis unit 120 can determine the confidence score for each (or, in some embodiments, at least one) feature in such a second subset. The determined confidence score(s) can be indicative or otherwise representative of a degree of accuracy of the correspondence between a feature in the second subset and the first area spanned by reference polygon. The analysis unit 120 can compare the confidence score(s) to a defined threshold score to determine a current area within the image included in the frame 134*c* that corresponding to the first area. The analysis unit 120 can determine, using at least the current area, the polygon 136*c* within an image included in the frame 134*c*. The analysis unit 120 can retain information indicative or otherwise representative of the current area and/or the polygon 136*c* in the matched container(s) 126.

A determination of a polygon (or, in some embodiments, another closed are having a defined boundary) that corresponds to the reference polygon (or, in some embodiments, a first polygon) can include processing or analysis of the polygon in order to determine information that can permit replacing an area spanned by the polygon with other digital content. Accordingly, in some aspects, the analysis unit 120 can determine location information indicative of placement within an image of the polygon. In one implementation, the location information can include two-dimensional position vectors indicative of respective vertices of the polygon in the plane of the image. In some embodiments, as illustrated in FIG. 2, the analysis unit 120 can include a position generation unit 245 that can determine at least a portion of the location information. As such, in some aspects, the position generation unit 245 can determine an average of a position vector over a series of position vectors corresponding to a series of respective polygons (including the determined polygon) corresponding to the reference polygon. In some instances, as illustrated by the series 130, the series of respective polygons can be included in respective frames prior to the frame that includes the determined polygon that corresponds to the reference polygon. In addition or in other aspects, the analysis unit 120 can determine orientation information indicative of an orientation of the second polygon with respect to an axis perpendicular to a plane containing the image. In some embodiments, as illustrated in FIG. 2, the analysis unit 120 can include a perspective analysis unit 240 that can determine the orientation information. Further or in yet other aspects, the analysis unit 120 can determine perspective information indicative of an arrangement of the polygon relative to other elements of the image. To that end, in some instances, the analysis unit 120 can determine a homography of the polygon relative to an immediately prior polygon (or, in some embodiments, to a defined or otherwise desired prior polygon) that also corresponds to the reference polygon. In some embodiments, as illustrated in FIG. 2, the perspective analysis unit 240 that can determine the homography, including the nine real numbers that can constitute the homography.

The analysis unit 120 can send the image information indicative or otherwise representative of placement of the polygon (or, in some embodiments, another closed are having a defined boundary) within an image to a template generation unit 140, which can update (e.g., generate or modify) metadata indicative of placement of each (or, in some embodiments, at least one) of a series of polygons corresponding to the reference polygon. The template generation unit 140 also can store or otherwise retain updated metadata 140 in a repository 150, which can be embodied in or can include one or more memory devices. At least a portion of the updated metadata 140 can be stored or otherwise retained in a file or any other type of data structure.

The analysis unit 120 also can send other image information to the template generation unit 140. Such image information can be indicative or otherwise representative of one or more objects that can occlude at least a portion of a polygon (or, in some embodiments, another closed area) that is tracked. To that end, in some embodiments, as is shown in FIG. 2, the analysis unit 120 can include a partition unit 215 that can determine that an object occludes, at least partially, the polygon. As part of such a determination, the partition unit 215 can determine or identify pixels that occlude at least a portion of the portion of the polygon, the pixels constituting the image that contains the polygon. The partition unit 215 also can generate image information indicative or otherwise representative of such pixels, which information can be sent by the analysis unit 120 to the template generation unit 140.

In some implementations, the template generation unit 140 can update a mask digital video to include a mask image for an image that includes a polygon (or, in some embodiments, another closed area) corresponding to a reference polygon. For instance, the template generation unit 140 can update the mask digital video for the image included in the frame 134b for which the polygon 136b was determined. The template generation unit 140 also can store or otherwise retain an updated mask video 144 in the repository 150. The updated mask video 144 can be stored or otherwise retained in a file or any other type of data structure. Therefore, in some embodiments, the template generation unit 140 can generate the mask image. To that end, the template generation unit 140 can characterize each pixel (or, in some instances, at least some of the pixels) constituting the image and located within the polygon as (i) a pixel to be displayed within the polygon when the image is presented after custom content is added or (ii) a pixel not to be displayed within the polygon when the image is presented after the custom content is added. Pixels characterized as not to be displayed may be assigned a defined color or may be defined as white. Further, the template generation unit 140 can configure a first set of pixels to correspond to those in the image, where the first set of pixels includes the pixels characterized to be displayed within the polygon. The template generation unit 140 also can configure a second set of pixels to have the defined color. In some aspects of the update of the mask digital video, the template generation unit 140 can retain or otherwise store mask information in the repository 150 as a single channel (e.g., alpha channel) video.

Figure 3:
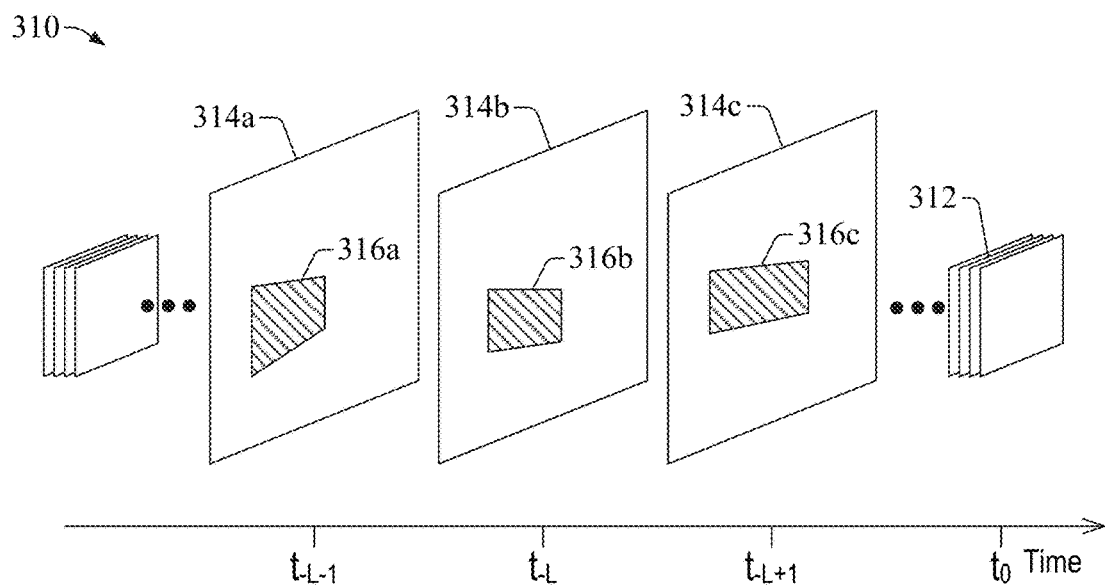
FIG. 3 presents an example of a schematic series of frames in a digital video in which a defined area is tracked in accordance with one or more embodiments of the disclosure.

While the identification of the polygons 136a-136b has been described in connection with subsequent frames corresponding to subsequent instants in a timeline of the series 130, the disclosure is not limited in that respect. As illustrated in FIG. 3, the selection unit 110 can identify a frame 312 that can be, for example, near the last frame in a series 310 of frames in a digital video segment. In addition, selection information available to the selection unit 110 can permit identifying a reference area in an image included in the frame 312. The reference area can be tracked in accordance with aspects described herein in frames prior to the frame 312. Specifically, a polygon 316c within an image included in frame 314c can be determined to correspond to the reference area associated with the frame 312. The frame 314c can correspond to an instant $t_{-L+1}$ (with L being a natural number) in the timeline of the series 310. In addition, a polygon 316b within another image included in frame 314b can be determined to correspond to the reference area. The frame 314b can correspond to an instant $t_{-L}$ in the timeline of the series 310. Further, a polygon 316c within yet another image included in frame 314c can be determined to correspond to the reference area associated with the frame 312 associated with the frame 312. The frame 314c can correspond to an instant $t_{-L-1}$ in the timeline of the series 310. Such a tracking can continue for a defined number of frames corresponding to respective instants prior to $t_{-L-1}$.

Figure 4D:
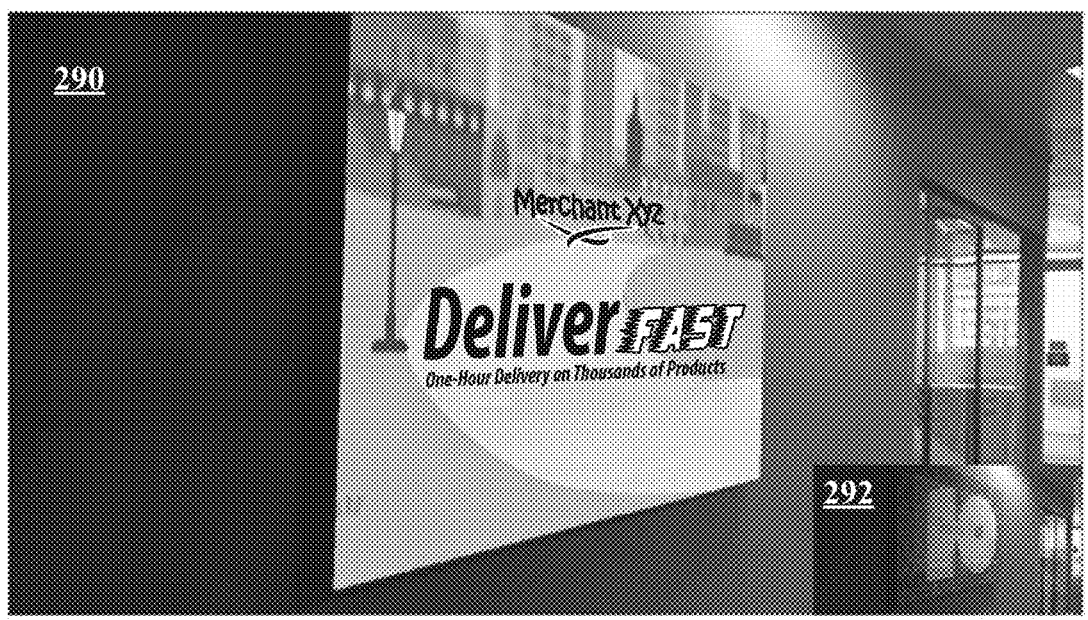
FIG. 4D presents an example of a tracked area having customized content replacing original content of the tracked area in accordance with one or more embodiments of the disclosure.

As mentioned, in certain implementations, a video can include digital content (digital image(s), digital audio, combinations thereof, etc.) that can be consumed by a user device (e.g., a personal computer, a mobile device, such as electronic book reader device (also referred to as an e-book reader or e-reader) smartphone or a tablet computer, or the like). The updated metadata 142 and/or the updated mask video can permit injecting customized content into polygons corresponding to the reference polygon over video frames included in the vide data. Accordingly, the customized content can be used to personalize the video. The customized content and the video can be produced by a publisher, such as an advertiser, a movie studio, a television studio, or a smaller production company. Publication of the video injected with the customize content can refer to the presentation and/or transmission of information indicative of availability of such customized video to a device associated with a distribution platform that can deliver the content package. The distribution platform can include, in one example, devices associated with (e.g., owned, leased, or otherwise administered) an entity that administers generation of videos or customized content. In another example, the distribution platform can be a third-party to such an entity. More specifically, in one example scenario, a content generator platform (not shown) for a publisher can include devices associated with an advertiser and the third-party can include a distributor of content packages generated by the advertiser via the content generator platform. In some embodiments, the distributor can rely on one or more channels for the distribution of content from the advertiser. The channels can include, for example, web-based media. A communication network (not depicted in FIG. 1) can permit or otherwise facilitate transmission of the video data 104 to at least the selection unit 110. FIG. 4D presents an example of an image 490 including customized content that replaces other content included in a polygonal area 492.

Figure 5:
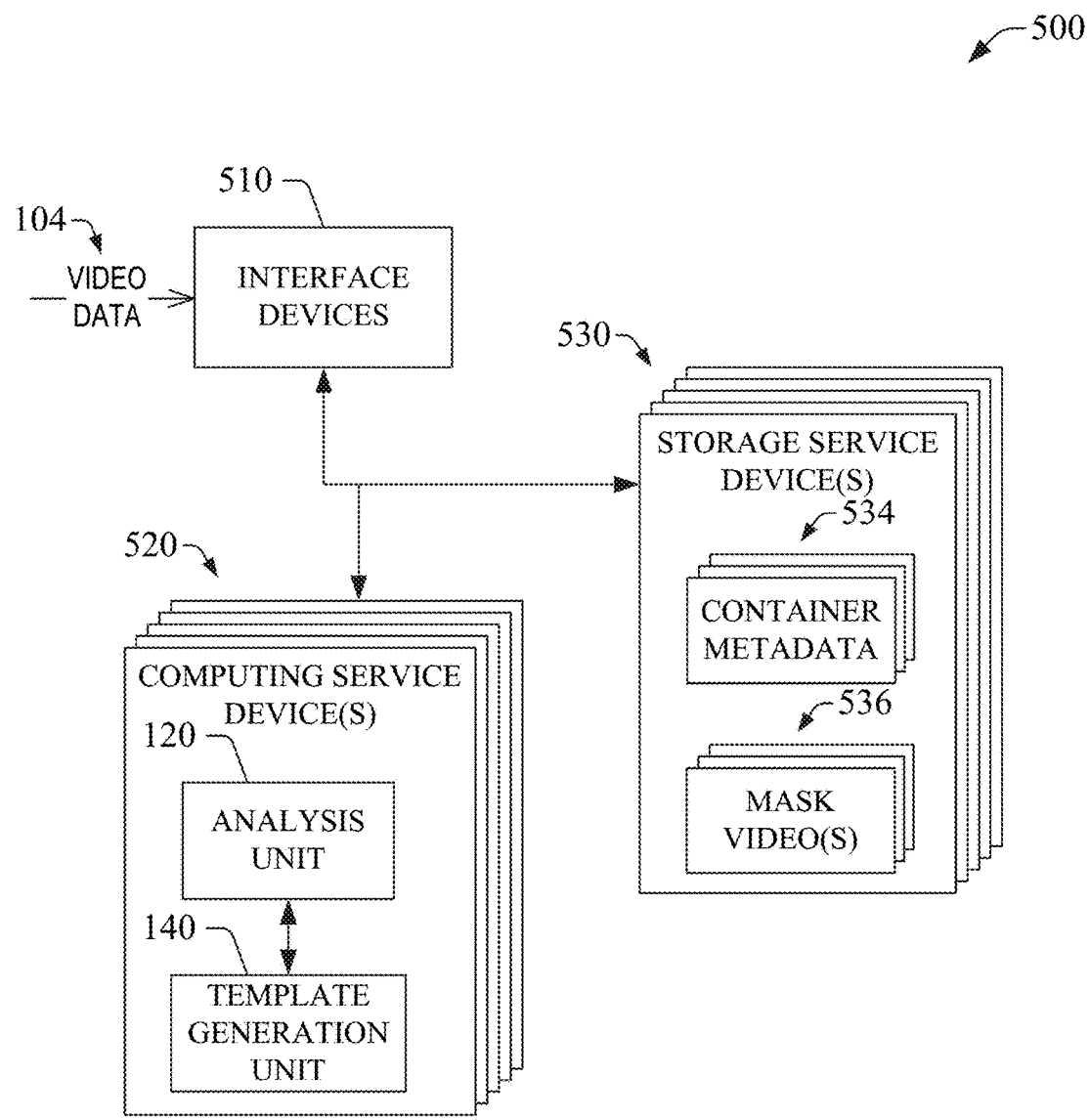
FIG. 5 presents an example of another operational environment for the tracking of a defined area in a digital video in accordance with one or more embodiments of the disclosure.

FIG. 5 illustrates another example of an operational environment 500 for the tracking of a defined area in a digital video in accordance with one or more embodiments of the disclosure. As illustrated, the operational environment 500 includes one or more interface device(s) 510 that can receive the video data 104. The interface devices 510 can include, in some embodiments, a frame grabber device (not shown) that can permit selecting frame data from the video data 104, the frame data corresponding to a portion of the video data 104. In addition, the interface devices 510 can include a display device (not depicted) that can permit presenting at least a portion of the frame data. The interface devices 510 also can include a selection device (not depicted) that can receive input information indicative of otherwise representative of one or more reference locations within an initial image represented by the frame data. The selection device can be functionally coupled to the display device. In addition or in some embodiments, the interface devices 510 can include one or more processors functionally coupled to one or more memory devices that can retain a frame selection module. At least one of the processor(s) can execute the frame selection module to select the frame data. The memory device(s) also can include a location selection module that can determine the one or more reference locations associated with an image included in the frame data. In some implementations, instead of receiving input information representative of such locations, the location selection module can receive reference location information programmatically. As such, in one example, the location selection module can be embodied in or can include an application programming interface (API) and/or another type of library that can permit receiving such an information via a function call, for example.

At least one of the interface devices 510 can send the information representative of the reference location(s) and at least a portion of the video data 104 to one or more computing service devices 520. As illustrated, the computing service device(s) 520 can include the analysis unit 120 and the template generation unit 140. The analysis unit 120 can process at least the portion of the video data 104 that is received, identifying respective polygons or another type of image container over a series of frames associated with the received video data in accordance with aspects disclosed herein. The template generation unit 140 can update (e.g., generate or modify), in accordance with aspects disclosed herein, metadata indicative or otherwise representative of placement of the respective polygons or the other type of image containers within respective images included in such a series of frames. As illustrated, the template generation unit 140 can send at least a portion of the updated metadata to one or more storage services 530 for storage in one or more memory elements 534, collectively referred to as container metadata 534. The template generation unit 140 also can update a mask video associated with the respective images in accordance with aspects disclosed herein. As further illustrated, the template generation unit 140 can send at least a portion of the updated metadata to one or more storage services 530 for storage in one or more memory elements 536, collectively referred to as mask video(s) 536.

Figure 6:
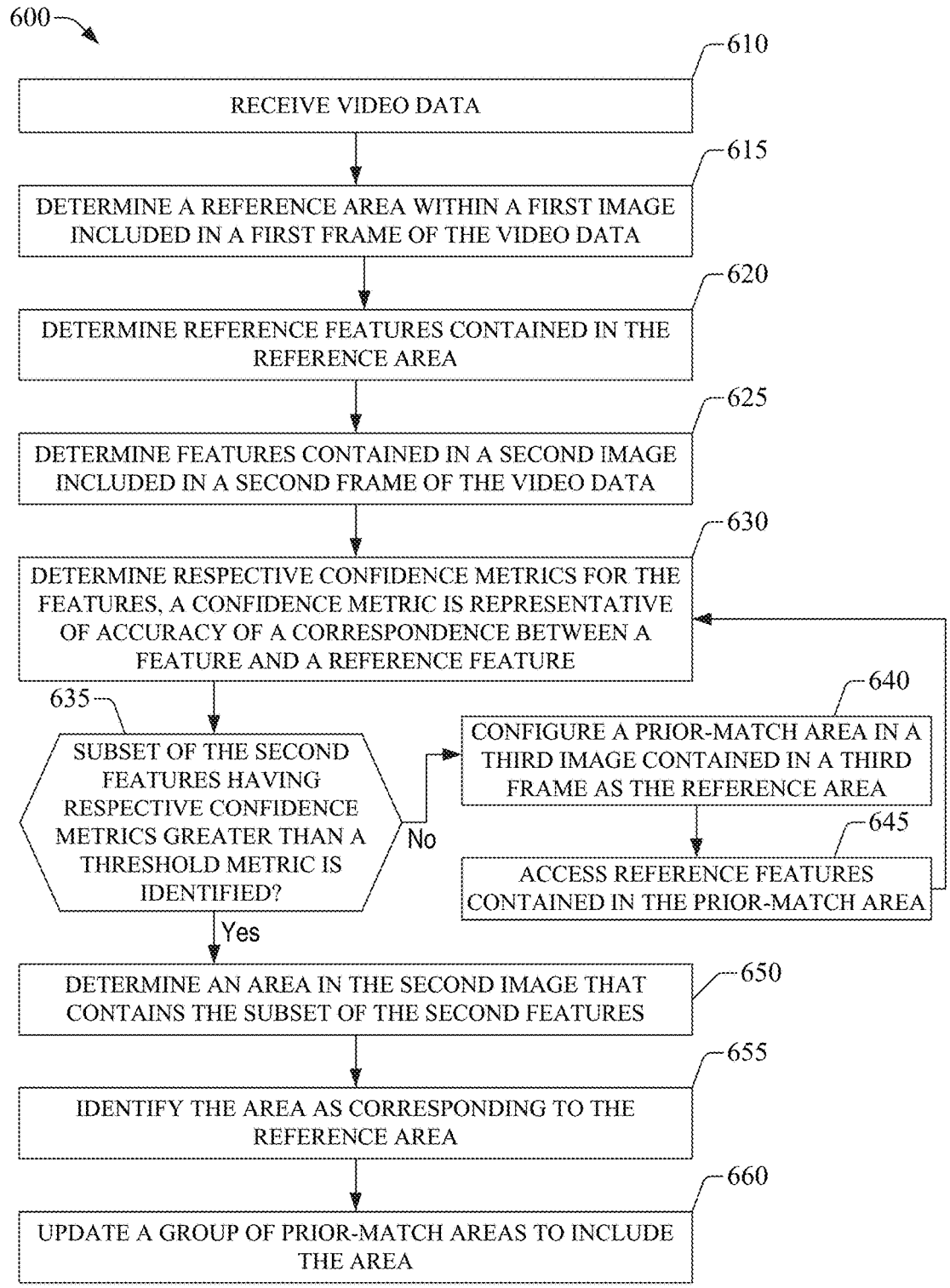
FIGS. 6-7 present examples of methods in accordance with one or more embodiments of the disclosure.
Figure 7:
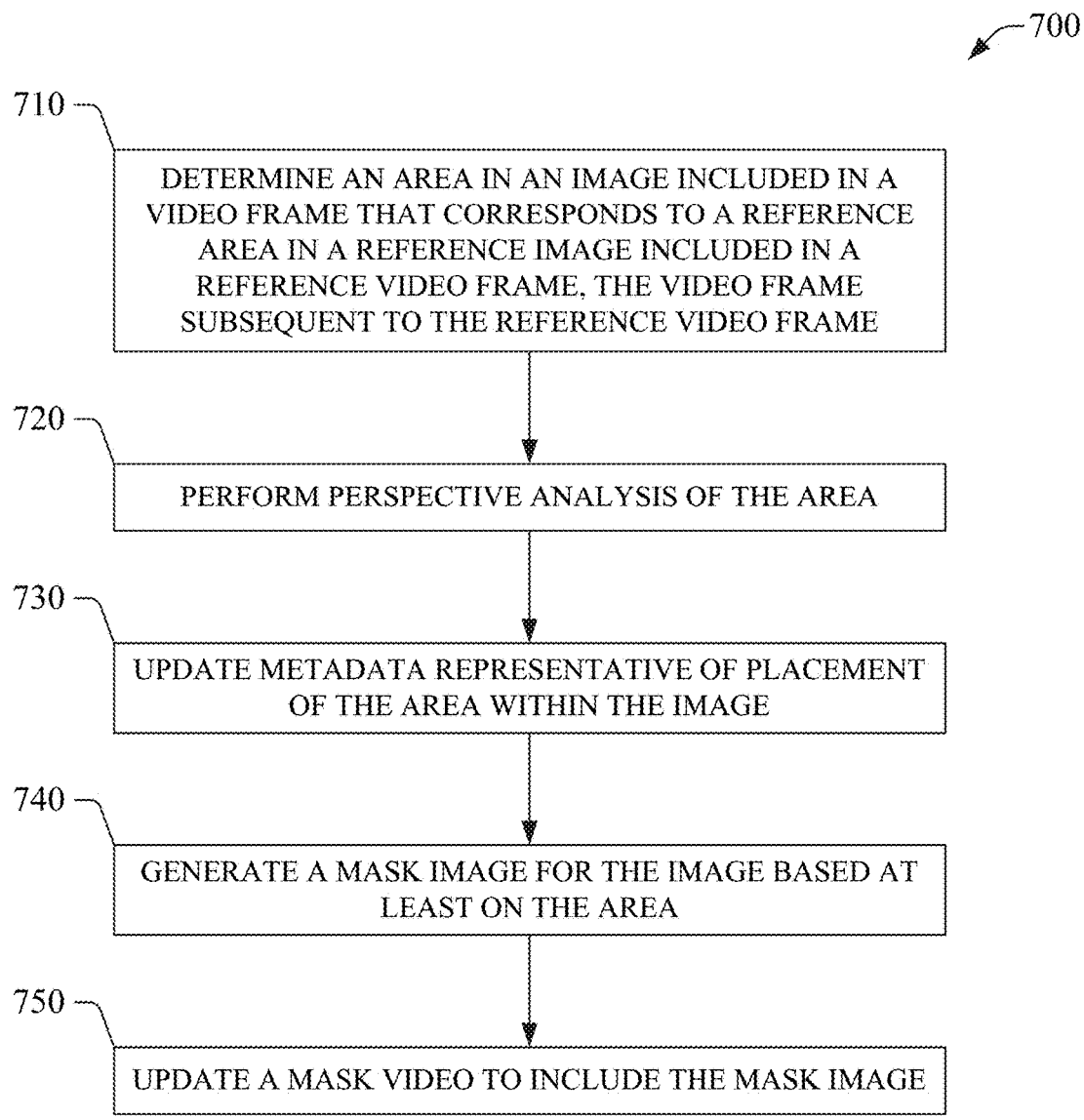

In view of the aspects of the disclosure described herein, example methods that can be implemented in accordance with the disclosure can be more readily appreciated with reference to the flowcharts in FIGS. 6-7. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more functionalities and/or advantages described herein.

It is noted that the methods of the disclosure can be retained on an article of manufacture, or computer-readable medium, to permit or facilitate transporting and transferring such methods to a computing device (e.g., a desktop computer; a mobile computer, such as an electronic book reader (e-reader) or other tablets, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

FIG. 6 illustrates a flowchart of an example method 600 for tracking a defined area in a video according to one or more embodiments of the disclosure. The example method 600 is not limited to a single defined area and can be implemented for tracking multiple defined areas. To that end, in some scenarios, each of the blocks of the example method 600 can be applied to at least two of the multiple defined areas. In other scenarios, various instances of the example method 600 can be implemented concurrently or serially in order to track the multiple defined areas (e.g., two or more polygons in a first frame of the video). In some embodiments, a computing system that has at least one processor and/or is functionally coupled to at least one processor can implement (e.g., compile, execute, compile and execute, etc.) one or more blocks of the example method 600. In some scenarios, one or more blocks of the example method 600 can be implemented in a distributed fashion by two or more computing devices contained in the computing system. Each of the two or more computing devices can have at least one processor or can be functionally coupled to at least one processor, where such processor(s) can implement at least one of the one or more blocks. Regardless of the example method 600 being implemented by a distributed or non-distributed computing system, the at least one processor can be functionally coupled to at least one memory device or other types of computer-readable non-transitory storage media.

At block 610, the computing system that implements the example method 400 can receive video data. As mentioned, in some aspects, the video data indicative or otherwise representative, in some implementations, digital images embodying, for example, one or more motion pictures; one or more animations; one or more gameplays or other segments of one or more video games; and the like. At block 615, the computing system can determine a reference area (or, in some embodiments, a first area) within a first image included in a first frame of the video data. As mentioned, the reference area can be embodied in a closed area having a boundary that defines a shape of the closed area, such as polygon or another geometrical shape. In one implementation, determining the reference area can include selecting a set of several points (e.g., three or more points) via user interface or a programmatic interface in order to define or otherwise characterize the reference area for tracking in accordance with aspects of the disclosure. In addition or another implementation, determining the reference area can include selecting one point via the user interface or the programmatic interface in order to define or characterize a location in the first image around which location the reference area can be determined or otherwise detected. To that end, in one example, the reference area can be automatically detected using at least in part contour detection in accordance with aspects described herein. The reference area that is so detected can be embodied in or can include a closed area (e.g., a polygon). In some implementations, the foregoing selecting functions can include receiving input information indicative of one or more position vectors in a plane containing the first image.

At block 620, the computing system can determine reference features (or, in some embodiments, first features) contained in the reference area. As mentioned, determining the reference features can include implementing one or more of techniques—FAST technique; BRIEF technique; ORB technique; SUSAN technique; SURF technique; SIFT technique, or the like—to determine a feature and/or a descriptor within the reference area of the first image. At block 625, the computing system can determine features contained in a second image included in a second frame of the video data. Determining the features also can include implementing one or more of techniques—FAST technique; BRIEF technique; ORB technique; SUSAN technique; SURF technique; SIFT technique, or the like—to determine a feature and/or a descriptor within the second image. At block 630, the computing system can determine respective confidence metrics for the features. In one aspect, a confidence metric is representative of a degree of accuracy of a correspondence between a feature of the second features and another feature of the reference features. Each of the respective confidence metrics can be embodied in, for example, a scalar in the range from 0 to 1. In some implementations, one or more rules can define and can be used to compute the respective confidence metrics. In some implementations, multiple rules can be utilized to determine a confidence metric. Specifically, for a feature of the second features, a first rule can be applied to determine a nearest neighbor of the feature in feature space. The nearest neighbor is included in the reference features in the reference area, and can be a specific feature having a minimum Euclidean distance from a descriptor vector of the feature of the second features. In some embodiments, a nearest-neighbor feature can be determined or otherwise identified using a best bin first (BBF) search technique or another variation of a k-d tree algorithm, for example, in a space of features. In one implementation, the descriptor vector can be 128-tuple having unit length. Unit length can provide invariance with respect to affine changes in illumination (e.g., contrast changes and/or brightness changes) in the reference area. Each of the 128 elements corresponds to a normalized value of an orientation histogram count determined for a (4-pixel)×(4-pixel) region within a (16-pixel)×(16-pixel) vicinity of the feature of the reference area, where the (4-pixel)×(4-pixel) region is partitioned into eight bins in order to determine an orientation histogram. Such a count corresponds to a sum of gradient magnitudes along one of eight sample directions (or bins). Orientation magnitudes that are utilized to determine orientation counts can each be weighted by a Gaussian function having σ=(16 pixels)/2. Such a Gaussian weighting can mitigate or otherwise avoid large changes in the descriptor vector with small changes in the position of the region, and can lessen the emphasis of gradients distant from a center of the descriptor (e.g., the center of the (4-pixel)×(4-pixel) region). Other type of weighting also can be applied in order to mitigate or otherwise avoid boundary effects on the determination of the descriptor vector.

A second rule can be applied to determine a second nearest-neighbor of the feature in feature space. The second nearest-neighbor also is included in the reference features, and can be a second specific feature having a second closest Euclidean distance from the descriptor vector of the feature of the second features. The second nearest-neighbors also can be determined or otherwise identified via the best bin first (BBF) search technique utilized to determine nearest neighbors or another variation of a k-d tree algorithm, for example.

In some aspects, determining the confidence metric for a feature of the second features includes determining a ratio between Euclidean distance from a nearest neighbor and Euclidean distance from a second nearest-neighbor. Such a distance ratio can represent the degree of accuracy of the correspondence between a feature of the second features and another feature of the reference features.

At block 635, the computing system can determine if a subset of the second features having respective confidence metrics equal to or greater than a threshold metric is identified. As an example, the threshold metric can be embodied in a configurable scalar from 0.8 to 1. As mentioned, in some implementations, a rule can define and/or can be used to compute confidence metrics representative of respective accuracy of a correspondence (or match) between features. In addition, another rule can define a discriminator (numeric or logic, for example) that can be used to classify a feature in an image as a satisfactory feature.

In a scenario in which it is determined, at block 635, that such a subset cannot be identified, the computing system can configure, at block 640, a prior-match area within a third image contained in a third frame as the reference area. The prior-match area can be embodied in or can include an area in the third image that is a satisfactory match (e.g., a best match, a second best match, a third best match, or the like) for the reference area determined at block 615. In one implementation, the prior-match area can be one of the areas in the matched container(s) 126. At block 645, the computing system can access reference contained in the prior-match area. Such features can be retained, in some implementations, in the matched container(s) 126. As illustrated, flow continues to block 630.

In the alternative, in a scenario in which it is determined, at block 635, that a subset of the second features having respective confidence metrics equal to or greater than a threshold metric is identified or otherwise available, flow continues to block 650. At block 650, the computing system can determine an area in the second image that contains the subset of the second features. In some implementations, determining the area can include determining, by the computing system, location information indicative of a position of the area within the second image. In addition or in other implementations, determining the area can include determining, by the computing system, orientation information indicative of an orientation of the area with respect to an axis perpendicular to a plane containing the second image. Further or in yet other implementations, determining the area can include performing, by the computing system, perspective analysis of the area. In one example, performing such an analysis can include determining a homography of the area relative to a second area within a third image included in a third frame of the video data, where the second area corresponding to the reference area and the third frame prior to the first frame.

At block 655, the computing system can identify or otherwise characterize the area as corresponding to the reference area. In some implementations, identifying or otherwise characterizing the area in such fashion can include updating, by the computing system, metadata representative of placement of the area within the second image. In addition or in other implementations, such identifying or otherwise characterizing function can include storing, by the computing system, the updated metadata in a storage device. In one example, the updated metadata can be formatted according to JavaScript Object Notation. At block 660, the computing system can update (e.g., generate or modify) a group of prior-match areas to include the area. Such a group can be embodied in or can constitute a set of containers included in the matched container(s) 126. In some embodiments, such an update can be conditional, based at least on a number of the second features being above a defined number (or threshold) of features present in a prior-match area.

FIG. 7 illustrates a flowchart of an example method 700 for retaining tracking information associated with the tracking of a defined area in a video according to one or more embodiments of the disclosure. In some embodiments, a computing system that has at least one processor and/or is functionally coupled to at least one processor can implement (e.g., compile, execute, compile and execute, etc.) one or more blocks of the example method 700. In some scenarios, one or more blocks of the example method 700 can be implemented in a distributed fashion by two or more computing devices contained in the computing system. Each of the two or more computing devices can have at least one processor or can be functionally coupled to at least one processor, where such processor(s) can implement at least one of the one or more blocks. Regardless of the example method 700 being implemented by a distributed or non-distributed computing system, the at least one processor can be functionally coupled to at least one memory device or other types of computer-readable non-transitory storage media.

At block 710, the computing system that implements the example method 700 can determine an area within an image included in a video frame, the area corresponds to a reference area in a reference image included in a reference video frame. In one aspect, the video frame is subsequent to the reference video frame. As mentioned, in some aspects, the video frame and the reference video frame can be included in a series of video frames contained in video data indicative or otherwise representative of digital images embodying, for example, a motion picture, an animation, a gameplay or another segment of a video game; and the like. The area within the image can be determined according to the example method 600, implementing one or more of the blocks of the example method 600. At block 720, the computing system can implement perspective analysis of the area in the image. At block 730, the computing system can update metadata representative of placement of the area within the image. At block 740, the computing system can generate a mask image for the image based at least on the area. In some implementations, generating the mask image can include characterizing or otherwise identifying each pixel (or, in some embodiments, at least one pixel) that constitutes the image and is located within the area as either a pixel to be displayed within the area or a pixel not to be displayed within the area. Pixels characterized as not to be displayed may be assigned a defined color, As such, generating the mask image also can include configuring a first set of pixels to correspond to those in the image in block 710, the first set of pixels including the pixels characterized to be displayed within the area; and further configuring a second set of pixels to have the defined color. At block 750, the computing system can update a mask video to include the mask image. Updating the mask video can include, for example, retaining mask information in a memory device as a single channel (e.g., alpha channel) video. The mask information can include information indicative or otherwise representative of the mask image generated at block 740.

Figure 8:
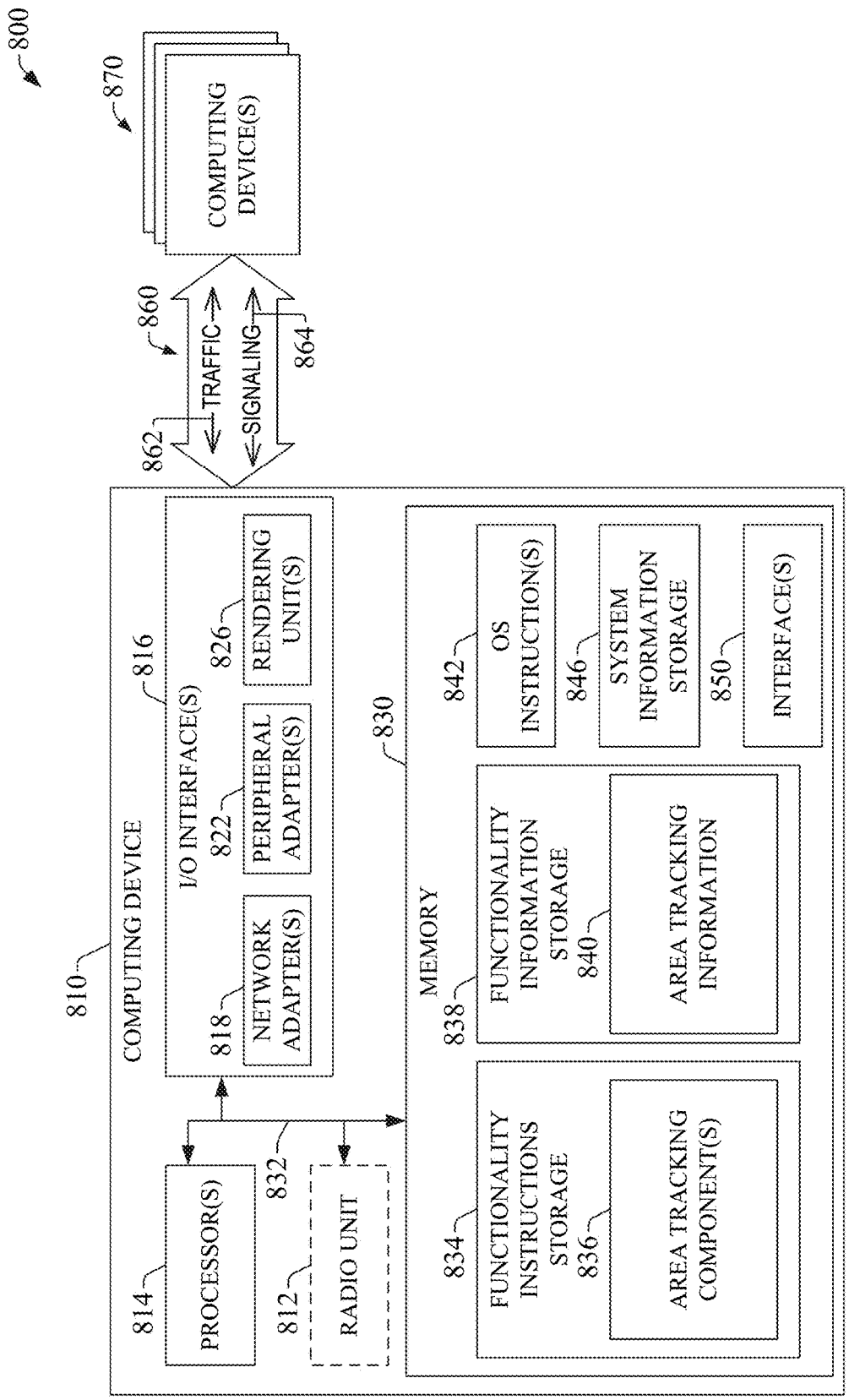
FIG. 8 presents an example of a computational environment for delivery and presentation of directed content in accordance with one or more embodiments of the disclosure.

FIG. 8 illustrates a block diagram of an example computational environment 800 for delivery and/or presentation of directed content in accordance with one or more aspects of the disclosure. The example computational environment 800 is merely illustrative and is not intended to suggest or otherwise convey any limitation as to the scope of use or functionality of the computational environment's architecture. In addition, the illustrative computational environment depicted in FIG. 8 should not be interpreted as having any dependency or requirement relating to any one or combination of components illustrated in the example operational environments of the disclosure. The example computational environment 800 or portions thereof can embody or can include, for example, one or more of the operational environment 100 or the operational environment 500.

The computational environment 800 represents an example implementation of the various aspects or features of the disclosure in which the processing or execution of operations described in connection with the electronic communication sessions secured and/or rendered context-aware via virtual locations disclosed herein can be performed in response to execution of one or more software components at the computing device 810. It should be appreciated that the one or more software components can render the computing device 810, or any other computing device that contains such components, a particular machine for electronic communication sessions secured and/or rendered context-aware via virtual locations as described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods described herein, such as the example methods presented in FIGS. 6-7. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 810 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 810 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the electronic communication sessions secured and/or rendered context-aware via virtual locations described herein can comprise personal computers; server computers; laptop devices; handheld computing devices, such as mobile tablets or electronic-book readers (e-readers); wearable computing devices; and multiprocessor systems. Additional examples can include set-top boxes, programmable consumer electronics, network personal computers (PCs), minicomputers, mainframe computers, blade computers, programmable logic controllers, distributed computing environments that comprise any of the above systems or devices, and the like.

As illustrated, the computing device 810 can comprise one or more processors 814, one or more input/output (I/O) interfaces 816, a memory 830, and a bus architecture 832 (also termed bus 832) that functionally couples various functional elements of the computing device 810. In certain embodiments, the computing device 810 can include, optionally, a radio unit 812. The radio unit 812 can include one or more antennas and a communication processing unit that can permit wireless communication between the computing device 810 and another device, such as one of the computing device(s) 870. The bus 832 can include at least one of a system bus, a memory bus, an address bus, or a message bus, and can permit exchange of information (data, metadata, and/or signaling) between the processor(s) 814, the I/O interface(s) 816, and/or the memory 830, or respective functional elements therein. In certain scenarios, the bus 832 in conjunction with one or more internal programming interfaces 850 (also referred to as interface(s) 850) can permit such exchange of information. In scenarios in which processor(s) 814 include multiple processors, the computing device 810 can utilize parallel computing.

The I/O interface(s) 816 can permit communication of information between the computing device and an external device, such as another computing device, e.g., a network element or an end-user device. Such communication can include direct communication or indirect communication, such as exchange of information between the computing device 810 and the external device via a network or elements thereof. As illustrated, the I/O interface(s) 816 can comprise one or more of network adapter(s) 818, peripheral adapter(s) 822, and rendering unit(s) 826. Such adapter(s) can permit or facilitate connectivity between the external device and one or more of the processor(s) 814 or the memory 830. For example, the peripheral adapter(s) 822 can include a group of ports, which can include at least one of parallel ports, serial ports, Ethernet ports, V.35 ports, or X.21 ports. In certain embodiments, the parallel ports can comprise General Purpose Interface Bus (GPM), IEEE-1284, while the serial ports can include Recommended Standard (RS)-232, V.11, Universal Serial Bus (USB), FireWire or IEEE-1394.

In one aspect, at least one of the network adapter(s) 818 can functionally couple the computing device 810 to one or more computing devices 870 via one or more traffic and signaling pipes 860 that can permit or facilitate exchange of traffic 862 and signaling 864 between the computing device 810 and the one or more computing devices 870. Such network coupling provided at least in part by the at least one of the network adapter(s) 818 can be implemented in a wired environment, a wireless environment, or both. The information that is communicated by the at least one of the network adapter(s) 818 can result from the implementation of one or more operations of a method in accordance with aspects of this disclosure. Such output can be any form of visual representation, including, but not limited to, textual, graphical, animation, audio, tactile, and the like. In certain scenarios, each of the computing device(s) 870 can have substantially the same architecture as the computing device 810. In addition or in the alternative, the rendering unit(s) 826 can include functional elements (e.g., lights, such as light-emitting diodes; a display, such as a liquid crystal display (LCD), a plasma monitor, a light emitting diode (LED) monitor, or an electrochromic monitor; combinations thereof; or the like) that can permit control of the operation of the computing device 810, or can permit conveying or revealing the operational conditions of the computing device 810.

In one aspect, the bus 832 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 832, and all buses described herein can be implemented over a wired or wireless network connection and each of the subsystems, including the processor(s) 814, the memory 830 and memory elements therein, and the I/O interface(s) 816 can be contained within one or more remote computing devices 870 at physically separate locations, connected through buses of this form, in effect implementing a fully distributed system. In certain embodiments, such a distributed system can implement the functionality described herein in a client-host or client-server configuration in which the video tracking component(s) 836 or the session configuration information 840, or both, can be distributed between the computing device 810 and at least one of the computing device(s) 870, and the computing device 810 and at least one of the computing device(s) 870 can execute such components and/or leverage such information.

The computing device 810 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 810, and can comprise, for example, both volatile and non-volatile media, and removable and/or non-removable media. In one aspect, the memory 830 can comprise computer-readable media in the form of volatile memory, such as random access memory (RAM), and/or non-volatile memory, such as read-only memory (ROM).

The memory 830 can comprise functionality instructions storage 834 and functionality information storage 838. The functionality instructions storage 834 can comprise computer-accessible instructions that, in response to execution (by at least one of the processor(s) 814), can implement one or more of the functionalities of the disclosure. The computer-accessible instructions can embody or can comprise one or more software components illustrated as area tracking component(s) 836. In one scenario, execution of at least one component of the area tracking component(s) 836 can implement one or more of the methods described herein, such as example method 600 or example method 700. For instance, such execution can cause a processor (e.g., one of the processor(s) 814) that executes the at least one component to carry out a disclosed example method. It should be appreciated that, in one aspect, a processor of the processor(s) 814 that executes at least one of the area tracking component(s) 836 can retrieve information from or retain information in one or more memory elements 840 in the functionality information storage 838 in order to operate in accordance with the functionality programmed or otherwise configured by the area tracking component(s) 836. The one or more memory elements 840 may be referred to as session configuration information 840. Such information can include at least one of code instructions, information structures, or the like. For instance, at least a portion of such information structures can be indicative of a mapping or categorization of communication session and virtual locations; access rules; and/or preferences for promotional content.

In some embodiments, one or more components of the area tracking component(s) 836 can embody or can constitute at least one of the analysis unit 120 and/or the template generation unit 140. As such, the one or more components can operate in accordance with, and can provide the functionality of, the analysis unit 120 and/or the template generation unit 140 in accordance with aspects described in this disclosure. In other embodiments, one or more of the area tracking component(s) 836 in combination with at least one of the processor(s) 814 can embody or can constitute at least one of the analysis unit 120 and/or the template generation unit 140, and can operate in accordance with, and can provide the functionality of, such units in accordance with aspects described in this disclosure.

At least one of the one or more interfaces 850 (e.g., application programming interface(s)) can permit or facilitate communication of information between two or more components within the functionality instructions storage 834. The information that is communicated by the at least one interface can result from implementation of one or more operations in a method of the disclosure. In certain embodiments, one or more of the functionality instructions storage 834 and the functionality information storage 838 can be embodied in or can comprise removable/non-removable, and/or volatile/non-volatile computer storage media.

At least a portion of at least one of the area tracking component(s) 836 or communication session configuration information 840 can program or otherwise configure one or more of the processors 814 to operate at least in accordance with the functionality described herein. One or more of the processor(s) 814 can execute at least one of the area tracking component(s) 836 and leverage at least a portion of the information in the functionality information storage 838 in order to provide electronic communication sessions secured and/or rendered context-aware via virtual locations in accordance with one or more aspects described herein.

It should be appreciated that, in certain scenarios, the functionality instruction(s) storage 834 can embody or can comprise a computer-readable non-transitory storage medium having computer-accessible instructions that, in response to execution, cause at least one processor (e.g., one or more of the processor(s) 814) to perform a group of operations comprising the operations or blocks described in connection with the disclosed methods.

In addition, the memory 830 can comprise computer-accessible instructions and information (e.g., data, metadata, and/or programming code instructions) that permit or facilitate the operation and/or administration (e.g., upgrades, software installation, any other configuration, or the like) of the computing device 810. Accordingly, as illustrated, the memory 830 can comprise a memory element 842 (labeled operating system (OS) instruction(s) 842) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 810 can dictate a suitable OS. The memory 830 also comprises system information storage 846 having data, metadata, and/or programming code that permits or facilitates the operation and/or administration of the computing device 810. Elements of the OS instruction(s) 842 and the system information storage 846 can be accessible or can be operated on by at least one of the processor(s) 814.

It should be recognized that while the functionality instructions storage 834 and other executable program components, such as the OS instruction(s) 842, are illustrated herein as discrete blocks, such software components can reside at various times in different memory components of the computing device 810, and can be executed by at least one of the processor(s) 814. In certain scenarios, an implementation of the area tracking component(s) 836 can be retained on or transmitted across some form of computer-readable media.

The computing device 810 and/or one of the computing device(s) 870 can include a power supply (not shown), which can power up components or functional elements within such devices. The power supply can be a rechargeable power supply, e.g., a rechargeable battery, and it can include one or more transformers to achieve a power level suitable for the operation of the computing device 810 and/or one of the computing device(s) 870, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 818) to connect operationally to the conventional power grid. In another aspect, the power supply can include an energy conversion component, such as a solar panel, to provide additional or alternative power resources or autonomy for the computing device 810 and/or one of the computing device(s) 870.

The computing device 810 can operate in a networked environment by utilizing connections to one or more remote computing devices 870. As an illustration, a remote computing device can be a personal computer, a portable computer, a server, a router, a network computer, a peer device or other common network node, and so on. As described herein, connections (physical and/or logical) between the computing device 810 and a computing device of the one or more remote computing devices 870 can be made via one or more traffic and signaling pipes 860, which can comprise wired link(s) and/or wireless link(s) and several network elements (such as routers or switches, concentrators, servers, and the like) that form a personal area network (PAN), a local area network (LAN), a metropolitan area network (MAN), a wide area network (WAN), and/or other networks (wireless or wired) having different footprints. Such networking environments can be configured in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 870) that are functionally coupled (e.g., communicatively linked or otherwise coupled) through a network having traffic and signaling pipes and related network elements. In a distributed computing environment, in one aspect, one or more software components (such as program modules) can be located in both a local computing device 810 and at least one remote computing device.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "platform," "interface," "unit," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "platform," "interface," "unit," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAIVI), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques delivery of directed content and presentation of the directed content at a device intended for consumption of such content. It is, of course, not possible to describe every conceivable combination of elements and/or methods for purposes of describing the various features of the disclosure, but it can be recognize that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method, comprising:
   receiving, by a computing device comprising at least one processor, a digital video comprising a series of multiple frames including respective multiple images;
   identifying, by the computing device, a first frame of the series of multiple frames, the first frame including a first image;
   presenting, by a display device functionally coupled to the computing device, the first image;
   receiving, by the computing device, selection information indicative of one or more locations in the first image;
   identifying, by the computing device, a first polygon in the first image based at least on the selection information;
   applying, by the computing device, at least one first rule to the first image to identify first features in a first area spanned by the first polygon;
   applying, by the computing device, the at least one first rule to a second image included in a second frame of the series of multiple frames to identify second features, the second frame subsequent to the first frame;
   determining, by the computing device, a first subset of the second features that correspond to the first features;
   applying, by the computing device, at least one second rule to remove at least one feature from the first subset of the second features, resulting in a second subset of the second features associated with the first area;
   determining, by the computing device, a confidence score indicative of a degree of certainty in a correspondence between the second subset of the second features and the first area;
   determining, by the computing device, that the confidence score is greater than a threshold score; and
   determining, by the computing device, a second polygon in the second image, the second polygon corresponding to the first polygon, the determining including determining location information indicative of a position of the second polygon;
      determining orientation information indicative of an orientation of the second polygon with respect to an axis perpendicular to a plane containing the image; and
      determining perspective information indicative of a spatial arrangement of the second polygon.

2. The method of claim 1, wherein the determining the perspective information comprises determining a homography of the second polygon relative to a third polygon within a third image included in a third frame of the series of multiple frames, the third polygon corresponding to the first polygon and the third frame prior to the second frame.

3. The method of claim 1, wherein the determining the location information comprises determining an average of a position vector over a series of position vectors corresponding to a series of respective polygons corresponding to the first polygon, the series of respective polygons included in respective frames prior to the second frame.

4. The method of claim 1, further comprising updating, by the computing device, metadata indicative of position vectors indicative of placement of each of a series of polygons corresponding to the first polygon to include the location information, the series of polygons included in respective frames within the series of multiple frames; and storing, by the computing device, the updated metadata in a first file within a storage device, the first file formatted according to JavaScript Object Notation.

5. The method of claim 4, further comprising generating, by the computing device, a mask image associated with the second image;
updating, by the computing device, a digital mask video to include the mask image; and
storing, by the computing device, the updated digital mask video in a second file within the storage device.

6. A method, comprising:
receiving, by a computing device comprising at least one processor, video data;
receiving, by the computing device, input information indicative of position vectors in a plane containing a first image included in a first frame of the video data;
determining, by the computing device, a reference area within the first image using the input information;
determining, by the computing device, first features contained in the reference area;
determining, by the computing device, second features contained in a second image included in a second frame of the video data;
determining, by the computing device, respective confidence metrics for the second features, a confidence metric of the respective confidence metrics is representative of accuracy of a correspondence between a feature of the second features and a feature of the first features;
identifying, by the computing device, a subset of the second features having respective confidence metrics greater than a threshold metric;
determining, by the computing device, an area in the second image that contains the subset of the second features; and
identifying, by the computing device, the area as corresponding to the reference area.

7. The method of claim 6, wherein the determining the area comprises determining location information indicative of a position of the area within the second image; and
determining orientation information indicative of an orientation of the area with respect to an axis perpendicular to a plane containing the second image.

8. The method of claim 7, further comprising performing, by the computing device, perspective analysis of the area, the performing including determining a homography of the area relative to a second area within a third image included in a third frame of the video data, the second area corresponding to the reference area and the third frame prior to the first frame.

9. The method of claim 7, further comprising updating, by the computing device, metadata representative of placement of the area within the second image.

10. The method of claim 9, further comprising storing, by the computing device, the updated metadata in a storage device, the updated metadata formatted according to JavaScript Object Notation.

11. The method of claim 7, further comprising generating, by the computing device, a mask image associated with the second image.

12. The method of claim 11, further comprising updating, by the computing device, a digital mask video to include the mask image; and
storing, by the computing device, in the storage device the updated digital mask video.

13. A system, comprising:
at least one memory device having computer-executable instructions; and
at least one processor coupled to the at least one memory and configured, by the computer-executable instructions, to:
receive video data;
receive input information indicative of position vectors in a plane containing a first image included in a first frame of the video data;
determine a reference area within the first image using the input information;
determine first features contained in the reference area;
determine second features contained in a second image included in a second frame of the video data;
determine respective confidence metrics for the second features, a confidence metric of the respective confidence metrics is representative of accuracy of a correspondence between a feature of the second features and a feature of the first features;
identify a subset of the second features having respective confidence metrics greater than a threshold metric;
determine an area in the second image that contains the subset of the second features; and
identify the area as corresponding to the reference area.

14. The system of claim 13, wherein to determine the area, the at least one processor is further configured to:
determine location information indicative of a position of the area within the second image; and
determine orientation information indicative of an orientation of the area with respect to an axis perpendicular to a plane containing the second image.

15. The system of claim 14, wherein the at least one processor is further configured to determine a homography of the area relative to a second area within a third image included in a third frame of the video data, the second area corresponding to the reference area and the third frame prior to the first frame.

16. The system of claim 14, wherein the at least one processor is further configured to update metadata representative of placement of the area within the second image.

17. The system of claim 16, wherein the at least one processor is further configured to generate a mask image associated with the second image.

18. The system of claim 17, wherein the at least one processor is further configured to:
update a digital mask video to include the mask image; and
store in the storage device the updated digital mask video.

* * * * *